United States Patent
Inaba et al.

(10) Patent No.: US 11,292,721 B2
(45) Date of Patent: Apr. 5, 2022

(54) GRAPHITE FILM AND MANUFACTURING METHOD THEREOF

(71) Applicant: KANEKA CORPORATION, Osaka (JP)

(72) Inventors: Keisuke Inaba, Settsu (JP); Yusuke Ohta, Settsu (JP); Satoshi Katayama, Settsu (JP); Makoto Kutsumizu, Settsu (JP); Yasushi Nishikawa, Settsu (JP)

(73) Assignee: KANEKA CORPORATION, Osaka (JP)

( * ) Notice: Subject to any disclaimer, the term of this patent is extended or adjusted under 35 U.S.C. 154(b) by 379 days.

(21) Appl. No.: 16/483,935

(22) PCT Filed: Feb. 5, 2018

(86) PCT No.: PCT/JP2018/003867
§ 371 (c)(1),
(2) Date: Aug. 6, 2019

(87) PCT Pub. No.: WO2018/147241
PCT Pub. Date: Aug. 16, 2018

(65) Prior Publication Data
US 2019/0389729 A1 Dec. 26, 2019

(30) Foreign Application Priority Data
Feb. 10, 2017 (JP) .............................. JP2017-023370

(51) Int. Cl.
*C01B 32/205* (2017.01)
*C01B 32/20* (2017.01)

(52) U.S. Cl.
CPC ............ *C01B 32/205* (2017.08); *C01B 32/20* (2017.08)

(58) Field of Classification Search
CPC .............................. C01B 32/20; C01B 32/205
See application file for complete search history.

(56) References Cited

U.S. PATENT DOCUMENTS

| | | | |
|---|---|---|---|
| 4,915,984 A | 4/1990 | Murakami | |
| 2018/0265362 A1* | 9/2018 | Park | ......................... B32B 9/007 |

FOREIGN PATENT DOCUMENTS

| | | |
|---|---|---|
| JP | S61-275116 A | 12/1986 |
| JP | H04-149013 A | 5/1992 |
| JP | 2004-299937 A | 10/2004 |
| JP | 2012-072036 A | 4/2012 |

(Continued)

OTHER PUBLICATIONS

May 15, 2018 Search Report issued in International Patent Application No. PCT/JP2018/003867.

(Continued)

*Primary Examiner* — Richard M Rump
(74) *Attorney, Agent, or Firm* — Oliff PLC

(57) ABSTRACT

A graphite film has a higher degree of thermal diffusion property in one in-plane direction and a method produces the graphite film. The graphite film includes a first axial direction, which is a direction having the highest thermal diffusivity in a film surface, and a second axial direction orthogonal to the first axial direction in the film surface. A value obtained by dividing the thermal diffusivity in the first axial direction by a thermal diffusivity in the second axial direction is not less than 1.020 and not more than 1.300.

8 Claims, 3 Drawing Sheets

(56) References Cited

FOREIGN PATENT DOCUMENTS

JP    5134190 B2 * 1/2013 ............. C01B 32/04
WO   WO-2017179619 A1 * 10/2017 ............. B32B 9/007

OTHER PUBLICATIONS

Aug. 13, 2019 International Preliminary Report on Patentability issued in International Patent Application No. PCT/JP2018/003867.

* cited by examiner

GRAPHITE FILM AND MANUFACTURING METHOD THEREOF

TECHNICAL FIELD

The present invention relates to a graphite film which is used as a heat dissipating film of a device such as an electronic device and a precision device and as a heat spreader material.

BACKGROUND ART

In recent years, semiconductor elements of electronic devices have become increasingly more sophisticated and have been mounted at increasingly higher densities, but have become increasingly smaller in size. This increases the amount of heat generated in the electronic devices. Such heat generation is local. As a material for diffusing such heat, a graphite film which is lightweight and excellent in thermal conductivity has an important place (Patent Literature 1). Such a graphite film has been used in mobile phones and smartphones.

CITATION LIST

Patent Literature

[Patent Literature 1]
Japanese Patent Application Publication, Tokukaishou, No. 61-275116

SUMMARY OF INVENTION

Technical Problem

Mobile phones and smartphones have had increasingly larger amount of heat generation due to their higher functionalities, but are designed with a limited space for heat diffusion. Therefore, demand for materials that can dissipate heat more efficiently within a limited space has grown. Such electronic devices are often shaped in a rectangle and are required to diffuse heat more in either one of in-plane directions.

Thus, it is an object of the present invention to provide a heat dissipating component that enhances heat dissipation property of an electronic device which requires a high degree of thermal diffusion property in one in-plane direction.

Solution to Problem

A graphite film in accordance with an embodiment of the present invention is a graphite film including a first axial direction and a second axial direction, the first axial direction being a direction having a highest thermal diffusivity in a film surface, the second axial direction being orthogonal to the first axial direction in the film surface, wherein a value obtained by dividing the thermal diffusivity in the first axial direction by a thermal diffusivity in the second axial direction is not less than 1.020 and not more than 1.300.

A method of producing a graphite film in accordance with an embodiment of the present invention includes the steps of: preparing a raw graphite film by subjecting a polymeric film to heat treatment until the raw graphite film has a thickness which is not less than 0.900 times and not more than 1.500 times a thickness of the polymeric film; and until the graphite film has a thickness which is 0.600 times or less a thickness of the raw graphite film, compressing the raw graphite film in a state in which a tension of not less than 1.00 N/cm and not more than 20.00 N/cm is applied to the raw graphite film in one direction of the raw graphite film.

Advantageous Effects of Invention

According to a graphite film and a method of producing the graphite film in accordance with the present invention, it is possible to provide a heat dissipating component capable of enhancing heat dissipation property of an electronic device which requires a high degree of thermal diffusion property in one in-plane direction.

DESCRIPTION OF EMBODIMENTS

Figure 1:
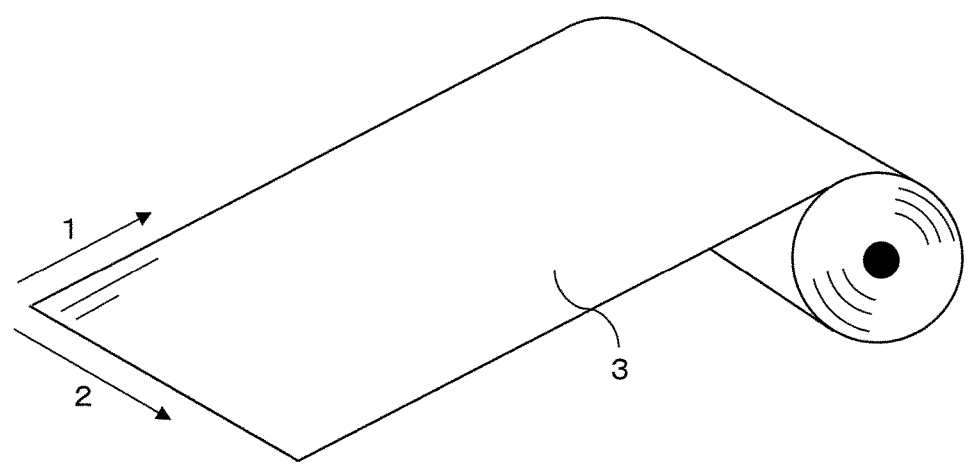
FIG. 1 is a perspective view of a graphite film in accordance with an embodiment of the present invention.

A graphite film in accordance with an embodiment of the present invention is a graphite film including a first axial direction and a second axial direction, the first axial direction being a direction having a highest thermal diffusivity in a film surface, the second axial direction being orthogonal to the first axial direction in the film surface, wherein a value obtained by dividing the thermal diffusivity in the first axial direction by a thermal diffusivity in the second axial direction is not less than 1.020 and not more than 1.300. Thus, it is possible to efficiently dissipate heat in even an electronic device in which a heat dissipation space can be provided only in one in-plane direction. The evaluation of heat dissipation property in the present invention is carried out according to the method described in Examples.

<Thermal Diffusivity>

A thermal diffusivity is measured by Distance-variation method. That is, in the case of measurement of the thermal diffusivity in the first axial direction, a radiation thermometry position is moved in the first axial direction to vary a distance between a periodical heating position and the radiation thermometry position. In this way, the thermal diffusivity in the first axial direction is measured. Similarly, in the case of measurement of the thermal diffusivity in the second axial direction, a radiation thermometry position is moved in the second axial direction to vary a distance between a periodical heating position and the radiation thermometry position. In this way, the thermal diffusivity in the second axial direction is measured.

The thermal diffusivity of a graphite film in a surface direction (a direction parallel to a film surface) is measured in the following manner. That is, the thermal diffusivity of a 4-mm-long, 40-mm-wide sample cut from a graphite film is measured with the use of a thermal diffusivity measuring device using a light alternating-current method, LaserPit (available from ULVAC-RIKO, Inc.), in an atmosphere of 20° C. with alternating current at 10 Hz. The thermal diffusivity in the first axial direction is measured in a state in which the first axial direction coincides with the 40-mm-wide side. Similarly, the thermal diffusivity in the second axial direction is measured in a state in which the second axial direction coincides with the 40-mm-wide side.

<Anisotropic Thermal Diffusion Property>

Anisotropic thermal diffusion property means that a thermal diffusivity has an anisotropy in a surface direction of a graphite film. In evaluating the anisotropic thermal diffusion property in the present invention, a value obtained by dividing the thermal diffusivity in the first axial direction by the thermal diffusivity in the second axial direction is used. Such a value is preferably not less than 1.020 and not more than 1.300, preferably not less than 1.020 and not more than 1.150, more preferably not less than 1.030 and not more than 1.150, and even more preferably not less than 1.040 and not more than 1.150. A graphite film satisfying the above values is excellent in anisotropic thermal diffusion property and is capable of controlling a thermal diffusion direction in a surface direction. That is, a graphite film excellent in anisotropic thermal diffusion property can conduct heat in particular in a specific direction and can thus be used preferably as a heat dissipation material and a heat dissipation component of, for example, an electronic device in which a direction of heat dissipation is determined.

<Percent Elongation>

As illustrated in FIG. 1, a direction 1 having the highest thermal conductivity in the film surface of the graphite film 3 is defined as a first axial direction. An axial direction 2 orthogonal to the first axial direction in the film surface is defined as a second axial direction.

The percent elongation is measured by carrying out the tensile test described later. The percent elongation in the first axial direction is preferably less than the percent elongation in the second axial direction. Particularly, from the viewpoint of improving anisotropic thermal diffusion property of the graphite film, the percent elongation in the first axial direction is preferably not less than 0.10% and not more than 2.00%, and more preferably not less than 0.20% and not more than 1.80%, and the percent elongation in the second axial direction is preferably not less than 1.00% and not more than 5.00%, and more preferably not less than 1.50% and not more than 4.00%.

A value obtained by dividing the percent elongation in the first axial direction by the percent elongation in the second axial direction is preferably not less than 0.100 and not more than 0.900, and more preferably not less than 0.160 and not more than 0.700, from the viewpoint of improving anisotropic thermal diffusion property of the graphite film.

<Tensile Test>

A tensile test is carried out according to ASTM-D-882. Specifically, the tensile test is carried out in the following manner. That is, a sample shaped in a size-1 dumbbell defined in JIS K 6251 is cut from a graphite film, and with the use of Strograph VES1D available from Toyo Seiki Seisaku-sho, Ltd. as a testing machine, the sample is elongated in the first axial direction or in the second axial direction at a chuck-to-chuck distance of 100 mm, at a tension speed of 50 mm/min, and at room temperature until the sample breaks. This test is carried out three times for the first axial direction and another three times for the second axial direction. Then, an average of three measurement values of the percent elongation in the first axial direction and an average of three measurement values of the percent elongation in the second axial direction are calculated. In measuring the percent elongation in the first axial direction, the sample is set such that the first axial direction of the sample is parallel to an imaginary line connecting the chucks of the testing machine. Similarly, in measuring the percent elongation in the second axial direction, the sample is set such that the second axial direction of the sample is parallel to the imaginary line connecting the chucks of the testing machine.

The percent elongation is obtained by dividing the length of a sample at break minus the length of the sample before the test by the length of the sample before the test.

Percent elongation=((Length of sample at break−Length of sample before test)/Length of sample before test)×100

<Raman Spectroscopic Measurement>

Raman spectroscopic measurement is carried out with the use of LabRam HR-800 (available from HORIBA Jyobin-Yvon). The Raman spectrum of the graphite film is measured under the conditions of 100× objective lens, beam diameter of 1 μm, no filter, integration time of 20 seconds, 5 times of integration, and a He—Ne laser with a wavelength of 633 nm as a light source.

A sample to be measured is prepared in the following manner. That is, a 15-mm-wide, 80-mm-long strip of sample is cut from a graphite film. A Scotch tape is stuck onto a surface of the graphite film sample, and peeling off the surface of the graphite film sample is then performed by peeling away the Scotch tape. This operation is carried out repeatedly on only one surface of the graphite film sample until the weight of the graphite film sample after the peeling is decreased to 75% of the weight of the graphite film sample before the peeling, so that a peeled surface is exposed.

The Raman spectroscopic measurement is carried out on the peeled surface of the graphite film sample in the first axial direction and in the second axial direction. A measurement direction relative to a laser is changed depending on whether the first axial direction or the second axial direction.

Figure 2:
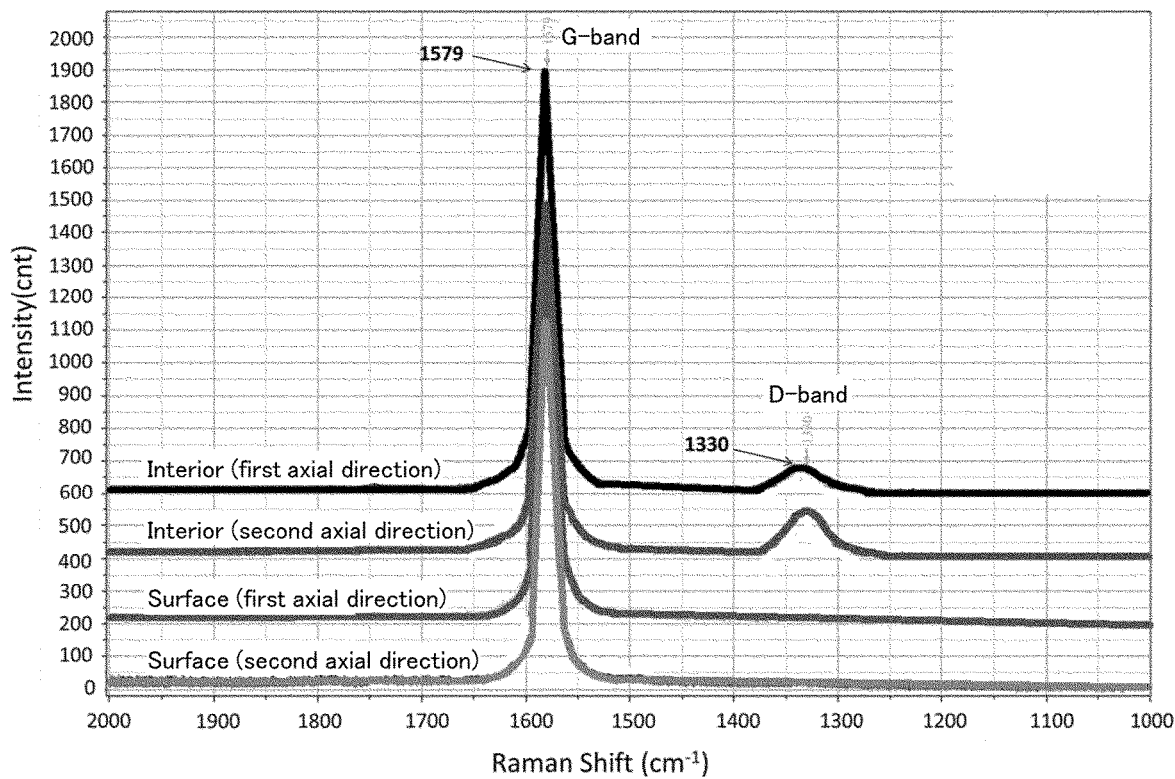
FIG. 2 is an example Raman spectral diagram of the graphite film in accordance with an embodiment of the present invention.

FIG. 2 illustrates an example of a Raman spectrum obtained by Raman spectroscopic measurement (Raman spectral diagram of the graphite film in accordance with Example 1 obtained by Raman spectroscopic measurement). In FIG. 2, "INTERIOR" indicates a result of measurement under laser irradiation of the peeled surface of the graphite film on a peeled side. In FIG. 2, "SURFACE" indicates a result of measurement under laser irradiation of another surface of the graphite film on a non-peeled side.

The G-band appearing in the Raman spectrum (in the vicinity of 1590 $cm^{-1}$) is derived from in-plane stretching vibration of a six-membered ring structure of carbon atoms in graphite. The D-band appearing in the Raman spectrum (in the vicinity of 1300 $cm^{-1}$ to 1400 $cm^{-1}$) is derived from disorder and defects of graphite structure. A peak of the D-band appears both in the interior in the first axial direction and in the interior in the second axial direction. In FIG. 2, a peak ratio between the D-band and the G-band in the interior in the first axial direction (D-band/G-band) is 0.067. Further, in FIG. 2, a peak ratio between the D-band and the G-band in the interior in the second axial direction (D-band/G-band) is 0.112. From the peak of the D-band appearing in the interior in the first axial direction and the peak of the D-band appearing in the interior in the second axial direction, disorder and defects of graphite structure in a graphite film are considered to have an influence on thermal diffusion property. As illustrated in FIG. 2, it is preferable that the peak of the D-band appears in the vicinity of 1300 $cm^{-1}$ to 1400 $cm^{-1}$ when the peeled surface of the graphite film in accordance with an embodiment of the present invention is subjected to Raman spectroscopic measurement.

<Method of Producing Graphite Film>

In a method of producing a graphite film in accordance with an embodiment of the present invention, a raw graphite film is prepared by subjecting a polymeric film to heat treatment, and the raw graphite film is compressed in a thickness direction (a direction vertical to the film surface) while a tension is applied to the raw graphite film. Consequently, a graphite film is obtained. The raw graphite film thus obtained and the graphite film thus obtained are each a stack of a plurality of layers of graphite (graphite layers) developed in a surface direction.

<Polymeric Film>

Examples of the polymeric film suitable for production of the raw graphite film include films made of a polymer such as polyimide, polyamide, polyoxadiazole, polybenzothiazole, polybenzobisthiazole, polybenzoxazole, polybenzobisoxasole, polyparaphenylene vinylene, polybenzimidazole, polybenzobisimidazole, and polythiazole. Particularly, the polymeric film is preferably a polyimide film. This is because the polyimide film can provide development of a graphite layer structure through carbonization and graphitization more easily than other polymeric films which are made of other organic materials.

<Raw Graphite Film>

To obtain the raw graphite film from the polymeric film, the carbonizing step and the graphitizing step may be carried out in a continuous manner or in a non-continuous manner. Further, the carbonizing step and the graphitizing step may be carried out in one step without being separated. The carbonizing step involves carrying out carbonization by preheating a polymeric film, which is a starting material, under reduced pressure or in an inert gas. This carbonizing step is ordinarily carried out at a temperature of approximately 1000° C. The graphitizing step following the carbonizing step is carried out under reduced pressure or in an inert gas. As the inert gas, argon or helium is suitably used. In the production method in accordance with an embodiment of the present invention, a heat treatment temperature for the graphitization is preferably 2400° C. or above, more preferably 2600° C. or above, even more preferably 2800° C. or above, and particularly preferably 2900° C. or above. Further, a method of obtaining the raw graphite film preferably includes a step of subjecting the polymeric film to heat treatment while applying a tension to the polymeric film in one direction of the polymeric film. The tension is preferably not less than 0.1 N/cm and not more than 5.0 N/cm, and more preferably not less than 0.2 N/cm and not more than 3.0 N/cm. The application of a tension to the polymeric film in one direction of the polymeric film in the heat treatment step allows the orientation of graphite crystals to be easily aligned in the direction of the application of the tension, and thus facilitates expression of the anisotropic thermal diffusion property.

Note that the raw graphite film may be a long film extending in one direction (for example, the first axial direction) or may be a sheet of film.

The raw graphite film preferably has a space formed between the graphite layers by expanding the polymeric film through the heat treatment of the polymeric film. From the viewpoint of imparting anisotropic thermal diffusion property to the graphite film, the heat treatment is carried out until the raw graphite film has a thickness which is preferably not less than 0.900 times and not more than 1.500 times the thickness of the polymeric film, and more preferably not less than 0.933 times and not more than 1.493 times the thickness of the polymeric film.

The density of the raw graphite film is preferably not less than 0.60 g/cm$^3$ and not more than 1.50 g/cm$^3$, and more preferably not less than 0.72 g/cm$^3$ and not more than 1.35 g/cm$^3$.

<Compression>

The raw graphite film is compressed in a state in which a predetermined tension is applied to the film in one direction of the film. A device for compression is not limited to a specific device as long as it can perform compression under the conditions described below, but may be a rolling device described later or may be a pressing device. Note, however, that the rolling device is preferable because it can easily perform compression while applying a tension.

Further, from the viewpoint of imparting anisotropic thermal diffusion property to the graphite film, the raw graphite film is compressed to a thickness which is preferably not less than 0.350 times and not more than 0.600 times the thickness of the raw graphite film, more preferably not less than 0.350 times and not more than 0.570 times the thickness of the raw graphite film, and even more preferably not less than 0.400 times and not more than 0.550 times the thickness of the raw graphite film. Note that in the specification of the present application, a value obtained by dividing the thickness of a film obtained after compression (graphite film) by the thickness of the raw graphite film is referred to as compressibility.

<Tension Applied During Compression>

The tension applied to the raw graphite film during the compression is preferably not less than 0.40 N/cm and not more than 30.00 N/cm, and more preferably not less than 1.00 N/cm and not more than 20.00 N/cm, from the viewpoint of imparting anisotropic thermal diffusion property to the graphite film.

<Linear Pressure Applied During Compression>

A linear pressure applied by rolling during the compression is preferably not less than 1 ton and not more than 3 tons per 200 mm width of the raw graphite film, from the viewpoint of imparting anisotropic thermal diffusion property to the graphite film. Note, however, that in a case where the width of the graphite film is below 200 mm, it is preferable that the linear pressure is decreased on the basis of a relative width of the graphite film. That is, in a case where the width of the graphite film is 10 mm, the linear pressure is preferably not less than 0.05 tons and not more than 0.15 tons. Note that in the specification of the present application, the linear pressure is intended to be a set press pressure of rolling bodies to be used in compressing the raw graphite film.

<Rolling Device>

A rolling device used in an embodiment of the present invention is not limited to a specific rolling device. Examples of the rolling device include a clearance type rolling device and a pressure type rolling device. The clearance type rolling device includes two rolling bodies and further includes a mechanism for adjusting a clearance between the rolling bodies. The pressure type rolling device includes two rolling bodies and further includes a mechanism for adjusting a contact pressure at a contact between the rolling bodies. The rolling device compresses the raw graphite film by causing the raw graphite film to pass between the two rolling bodies.

A combination of the two rolling bodies is not limited to a specific combination, but is preferably a combination of metal rolls, a combination of resin rolls, or a combination of a metal roll and a resin roll. The hardness of the metal roll is preferably greater than D95, and the hardness of the resin roll is preferably D77 or greater, and more preferably D85 or greater. At least one of the two rolling bodies is preferably shaped in a roll since it can be rotated so that the raw graphite film can be continuously passed between the rolling bodies.

Further, in a case where the rolling device is used to apply a tension to the raw graphite film in a direction in which the raw graphite film is conveyed (a direction in which the raw graphite film is rolled), the first axial direction of the obtained graphite film is the direction in which the raw graphite film is conveyed (the direction in which the raw graphite film is rolled). The tension is preferably applied in the direction in which the raw graphite film is rolled.

<Clearance Type Rolling Device>

Figure 3:
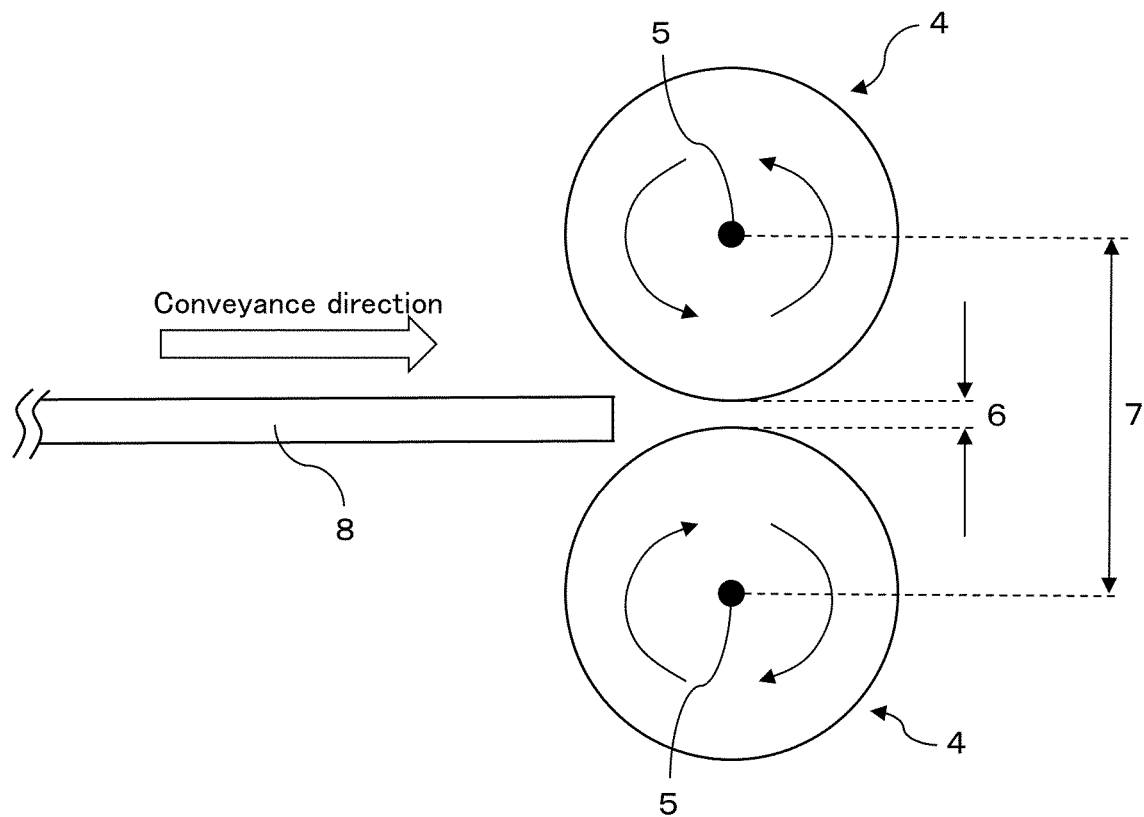
FIG. 3 is a schematic diagram illustrating a process of rolling a raw graphite film.

With reference to FIG. 3, a clearance 6 between two rolling bodies 4 for rolling a raw graphite film 8 will be described. The clearance 6 in an embodiment of the present invention refers to a gap between the two rolling bodies 4. The amount of the clearance 6 in accordance with an embodiment of the present invention can be measured by measuring a distance between respective datums provided in the two rolling bodies. A clearance of 0 μm (hereinafter referred to as a zero point) in an embodiment of the present invention refers to a state in which the rolling bodies 4 are in contact with each other with their original shapes maintained without being deformed by the contact of the rolling bodies 4. The rolling bodies 4 in accordance with an embodiment of the present invention may be deformed by a contact pressure applied at the contact between the rolling bodies 4. Thus, care is needed in setting the zero point.

The datums provided in the rolling bodies can be set as appropriate as long as they are points provided in the rolling bodies which points can be used by a person skilled in the art to measure the clearance of 0 μm. For example, in a case where the two rolling bodies 4 are each shaped in a roll as illustrated in FIG. 3, it is preferable that a distance 7 between respective center points 5 of the two rolling bodies 4 (rolls) is measured by using the center points 5 as datums for the measurement. In the specification of the present application, a state in which the distance 7 between the center points of the two rolling bodies 4 is increased by 10 μm from the zero point is defined as a "clearance of +10 μm", and a state in which the distance 7 between the center points of the two rolling bodies 4 is decreased by 10 μm from the zero point is defined as a "clearance of −10 μm". Further, in a case where the rolling bodies are each shaped in a plate, the zero point may be measured with respect to respective references provided on first surfaces of the rolling bodies opposite from second surfaces which contact the raw graphite film.

Note that the present invention can also be configured as described below.

A graphite film in accordance with an embodiment of the present invention is a graphite film including a first axial direction and a second axial direction, the first axial direction being a direction having a highest thermal diffusivity in a film surface, the second axial direction being orthogonal to the first axial direction in the film surface, wherein a value obtained by dividing the thermal diffusivity in the first axial direction by a thermal diffusivity in the second axial direction is not less than 1.020 and not more than 1.300.

Further, a graphite film in accordance with an embodiment of the present invention may be arranged such that a percent elongation in the first axial direction obtained through measurement in a tensile test is lower than a percent elongation in the second axial direction obtained through measurement in the tensile test. In the tensile test, the measurement is carried out according to ASTM-D-882 such that a sample shaped in a size-1 dumbbell defined in JIS K 6251 is cut from the graphite film, the sample is elongated at a chuck-to-chuck distance of 100 mm, at a tension speed of 50 mm/min, and at room temperature until the sample breaks, and the percent elongation is calculated. Still further, a graphite film in accordance with an embodiment of the present invention may be arranged such that the percent elongation in the first axial direction is not less than 0.20% and not more than 1.80%, and the percent elongation in the second axial direction is not less than 1.50% and not more than 4.00%.

Yet further, a graphite film in accordance with an embodiment of the present invention may be arranged such that when a peeled surface exposed by peeling a surface of the graphite film is subjected to Raman spectroscopic measurement, a peak of a D-band appears in a vicinity of 1300 $cm^{-1}$ to 1400 $cm^{-1}$.

A method of producing a graphite film in accordance with an embodiment of the present invention includes the steps of: preparing a raw graphite film by subjecting a polymeric film to heat treatment until the raw graphite film has a thickness which is not less than 0.900 times and not more than 1.500 times a thickness of the polymeric film; and until the graphite film has a thickness which is 0.600 times or less a thickness of the raw graphite film, compressing the raw graphite film in a state in which a tension of not less than 1.00 N/cm and not more than 20.00 N/cm is applied to the raw graphite film in one direction of the raw graphite film.

Further, a method of producing a graphite film in accordance with an embodiment of the present invention may be arranged such that the compression is carried out by rolling, and the tension is applied in a rolling direction.

Still further, a method of producing a graphite film in accordance with an embodiment of the present invention may be arranged such that the step of preparing the raw graphite film includes a step of subjecting a polymeric film to heat treatment in a state in which a tension is applied to the polymeric film in one direction of the polymeric film.

Yet further, a method of producing a graphite film in accordance with an embodiment of the present invention may be arranged such that a linear pressure of not less than 1 ton or more per 200 mm of the raw graphite film is applied to the raw graphite film during the compression.

EXAMPLES

Different Examples of the present invention will be described below together with Comparative Examples.

<Method of Preparing Polymeric Film>

[Preparation of Polymeric Film from Resin A]

In a dimethylformamide (hereinafter referred to as DMF) solution obtained by dissolving a diamine consisting of 75 mol % of 4,4'-diaminodiphenyl ether (hereinafter referred to as ODA) and 25 mol % of p-phenylenediamine (hereinafter referred to as PDA), an acid dianhydride consisting of 100 mol % of pyromellitic dianhydride (hereinafter referred to as PMDA) was dissolved so as to have an amount equimolar to the diamine. As a result, a solution containing 18.5 wt % of polyamic acid was obtained. While cooling the solution, acetic anhydride (having 1 equivalent weight with respect to a carboxylic acid group contained in the polyamic acid), isoquinoline (having 1 equivalent weight with respect to the carboxylic acid group), and an imidized catalyst containing DMF were added to the solution for defoaming. A mixed solution thus obtained was then applied to an aluminum foil so as to have a predetermined thickness after having been dried. A layer of the mixed solution on the aluminum foil was dried with the use of a hot-air oven and a far-infrared heater.

The following will describe a drying condition for the layer of the mixed solution on the aluminum foil to have a finishing thickness of 75 μm. As the layer of the mixed solution on the aluminum foil, the mixed solution was dried at 120° C. for 240 seconds with the use of the hot-air oven, and consequently a gel film having a self-supporting property was obtained. The gel film was peeled off from the aluminum foil and then fixed to a frame. Further, the gel film was dried by gradually heating up as follows: that is, at 120° C. for 30 seconds, at 275° C. for 40 seconds, at 400° C. for 43 seconds, at 450° C. for 50 seconds with the use of the hot-air oven, and then at 460° C. for 23 seconds with the use of the far-infrared heater. Films having the other thicknesses were obtained by adjusting a firing time in proportion to the thickness. For example, for a film having a thickness of 50 μm, the firing time was set to be half the firing time for the film having the thickness of 75 μm. As described above, each polymeric film (having birefringence of 0.14) was prepared from resin A.

<Raw Graphite Film>

(1) Raw Graphite Film (GS1)

A polymeric film obtained from resin A and having a thickness of 75 μm, a width of 250 mm, and a length of 50 m was subjected to heat treatment (carbonization) in a continuous carbonization step. The continuous carbonization step is a carbonization step of continuously firing a long polymeric film while continuously feeding the long polymeric film into a heating treatment device. The continuous carbonization step was carried out in a nitrogen inert gas. A temperature for carrying out the continuous carbonization step was 720° C., and a tension applied to the polymeric film was 0.5 N/cm. Next, the film having been carbonized by heat treatment in the continuous carbonization step was subjected to graphitization by heating up to 2900° C. at a rate of temperature rise of 1.0° C./min. In this manner, a raw graphite film (GS1) was obtained.

The raw graphite film (GS1) was 70 μm in thickness, 1.05 g/cm³ in density, and 200 mm in width, and a value obtained by dividing the thickness of the raw graphite film by the thickness of the polymeric film (thickness of the raw graphite film/thickness of the polymeric film) was 0.933.

(2) Raw Graphite Film (GS2)

A raw graphite film (GS2) was obtained in the same manner as the GS1, except that the film having been carbonized was subjected to graphitization by heating at a rate of temperature rise of 2.5° C./min.

The raw graphite film (GS2) was 95 μm in thickness, 0.85 g/cm³ in density, and 200 mm in width, and the thickness of the raw graphite film/the thickness of the polymeric film was 1.267.

(3) Raw Graphite Film (GS3)

A raw graphite film (GS3) was obtained in the same manner as the GS1, except that the film having been carbonized was subjected to graphitization by heating at a rate of temperature rise of 0.5° C./min.

The raw graphite film (GS3) was 60 μm in thickness, 1.35 g/cm³ in density, and 200 mm in width, and the thickness of the raw graphite film/the thickness of the polymeric film was 0.800.

(4) Raw Graphite Film (GS4)

A raw graphite film (GS4) was obtained in the same manner as the GS1, except that the film having been carbonized was subjected to graphitization by heating at a rate of temperature rise of 3.0° C./min.

The raw graphite film (GS4) was 112 μm in thickness, 0.72 g/cm³ in density, and 200 mm in width, and the thickness of the raw graphite film/the thickness of the polymeric film was 1.493.

(5) Raw Graphite Film (GS5)

A raw graphite film (GS5) was obtained in the same manner as the GS1, except that the film having been carbonized was subjected to graphitization by heating at a rate of temperature rise of 0.35° C./min.

The raw graphite film (GS5) was 45 μm in thickness, 1.80 g/cm³ in density, and 200 mm in width, and the thickness of the raw graphite film/the thickness of the polymeric film was 0.600.

(6) Raw Graphite Film (GS6)

A polymeric film obtained from resin A and having a thickness of 75 μm, a width of 250 mm, and a length of 50 m was subjected to heat treatment in a cylindrical carbonization step. The cylindrical carbonization step is a step of carbonizing a long polymeric film within a heating treatment device in a state in which the long polymeric film was would around a graphite cylinder of 100 mm in diameter. The cylindrical carbonization step was carried out in an inert gas such as nitrogen or argon. A temperature for carrying out the cylindrical carbonization step was 1400° C., and a rate of temperature rise was 5° C./min. Next, the film having been carbonized by heat treatment in the cylindrical carbonization step was subjected to graphitization by heating up to 2900° C. at a rate of temperature rise of 1.0° C./min. In this manner, a raw graphite film (GS6) was obtained.

The raw graphite film (GS6) was 95 μm in thickness, 0.85 g/cm³ in density, and 200 mm in width, and the thickness of the raw graphite film/the thickness of the polymeric film was 1.267.

Table 1 shows the methods of producing the raw graphite films GS1 to GS6 and properties of the raw graphite films GS1 to GS6.

TABLE 1

| Raw graphite film | Carbonization method | Graphitization condition - Rate of temperature rise ° C./min | Graphitization condition - Maximum temperature ° C. | Thickness μm | Density g/cm³ | Thickness of Raw graphite film/thickness of polymeric film | Width mm |
|---|---|---|---|---|---|---|---|
| GS1 | Continuous carbonization | 1.00 | 2900 | 70 | 1.05 | 0.933 | 200 |
| GS2 | Continuous carbonization | 2.50 | 2900 | 95 | 0.85 | 1.267 | 200 |
| GS3 | Continuous carbonization | 0.50 | 2900 | 60 | 1.35 | 0.800 | 200 |
| GS4 | Continuous carbonization | 3.00 | 2900 | 112 | 0.72 | 1.493 | 200 |

TABLE 1-continued

| Raw graphite film | Carbonization method | Graphitization condition - Rate of temperature rise °C./min | Graphitization condition - Maximum temperature °C. | Thickness μm | Density g/cm³ | Thickness of Raw graphite film/thickness of polymeric film | Width mm |
|---|---|---|---|---|---|---|---|
| GS5 | Continuous carbonization | 0.35 | 2900 | 45 | 1.80 | 0.600 | 200 |
| GS6 | Cylindrical carbonization | 1.00 | 2900 | 95 | 0.85 | 1.267 | 200 |

<Thermal Diffusivity in Surface Direction of Raw Graphite Film>

The thermal diffusivity of a graphite film in a surface direction was measured in the following manner. That is, the thermal diffusivity of a 4-mm-long, 40-mm-wide sample cut from a graphite film was measured with the use of a thermal diffusivity measuring device using a light alternating-current method, LaserPit (available from ULVAC-RIKO, Inc.), in an atmosphere of 20° C. with alternating current at 10 Hz. In measuring the thermal diffusivity in the first axial direction, the sample was cut such that the first axial direction coincided with the 40-mm-wide side of the cut sample. Similarly, in measuring the thermal diffusivity in the second axial direction, the sample was cut such that the second axial direction coincided with the 40-mm-wide side of the cut sample.

<Length of Graphite Film>

The length of the graphite film was measured in the first axial direction and in the second axial direction with the use of a ruler in a thermostatic chamber at room temperature of 23° C.

<Thickness of Graphite Film>

The thickness of the graphite film was measured in a thermostatic chamber at room temperature of 23° C. with the use of a thickness gage, HEIDENHAIN-CERTO (available from HEIDENHAIN).

<Density of Graphite Film>

The density of the graphite film was calculated by dividing the weight (g) of the graphite film measuring 10 cm per side by the volume (cm³) of the graphite film calculated by multiplying the length (10 cm), the width (10 cm), and the thickness of the graphite film.

<Compressibility of Graphite Film>

Compressibility of a graphite film was calculated by dividing the thickness of the film (graphite film) after compression by the thickness of the raw graphite film.

Compressibility=Thickness of graphite film/Thickness of raw graphite film

<Percent Elongation of Graphite Film>

Percent elongation of the graphite film was measured by carrying out a tensile test described below. A tensile test was carried out according to ASTM-D-882. Specifically, the tensile test was carried out in the following manner. That is, a sample shaped in a size-1 dumbbell defined in JIS K 6251 was cut from a graphite film, and with the use of Strograph VES1D available from Toyo Seiki Seisaku-sho, Ltd. as a testing machine, the sample was elongated according to ASTM-D-882 at a chuck-to-chuck distance of 100 mm, at a tension speed of 50 mm/min, and at room temperature until the sample breaks. This test was carried out three times for the first axial direction and another three times for the second axial direction. Then, an average of the percent elongation in the first axial direction and an average of the percent elongation in the second axial direction were calculated. In measuring the percent elongation in the first axial direction, the sample was set such that the first axial direction of the sample was parallel to an imaginary line connecting the chucks of the testing machine. Similarly, in measuring the percent elongation in the second axial direction, the sample was set such that the second axial direction of the sample was parallel to the imaginary line connecting the chucks of the testing machine.

The percent elongation was obtained by dividing the length of a sample at break minus the length of the sample before the test by the length of the sample before the test. Each sample length was measured with the use of a ruler.

Percent elongation=(Length of sample at break−Length of sample before test)/Length of sample before test <Hardness of Rolling Bodies>

Hardness of the rolling bodies was measured according to "Rubber, vulcanized or thermoplastic-Determination of hardness" described in JIS K6253-3. An indentor having the shape defined in JIS K6253-3 was pressed against the surface of a specimen surface by a force of a spring defined, and a hardness obtained from indentation depth of the indentor at that time was measured. Specifically, the hardness was measured in a thermostatic chamber at room temperature of 23° C. with the use of ASKER Durometer Type D (available from Kobunshi Keiki Co., Ltd.). The test was carried out five times, and a median value of the five test results was provided in Tables.

<Clearance of Rolling Device>

A clearance between rolling bodies was measured by measuring a distance between respective center points of the rolling bodies (rolls) by using the center points as datums for the measurement. Specifically, an increased distance between the center points of the rolling bodies with respect to the zero point or a decreased distance between the center points of the rolling bodies with respect to the zero point was defined as the clearance.

<Evaluation of Heat Dissipation Performance>

Figure 4:
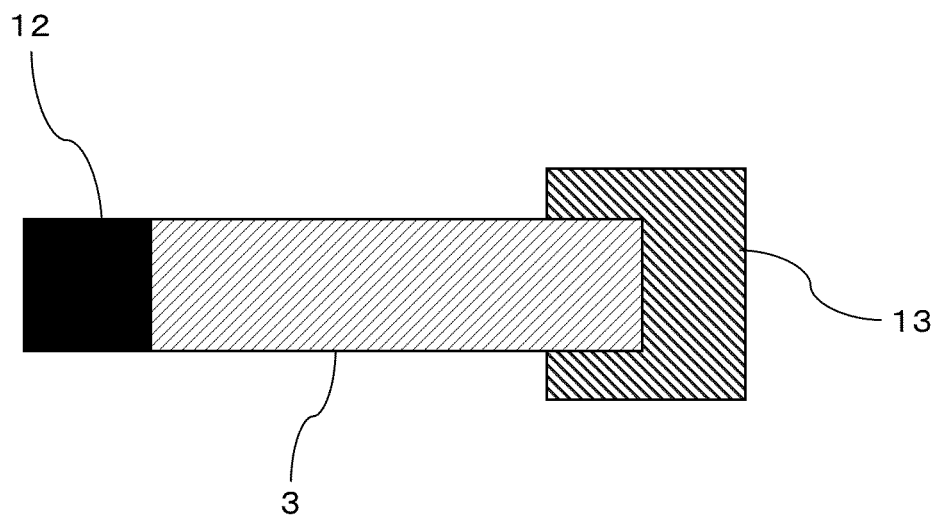
FIG. 4 is a top view illustrating a method of evaluating heat dissipation property in the present invention.
Figure 5:
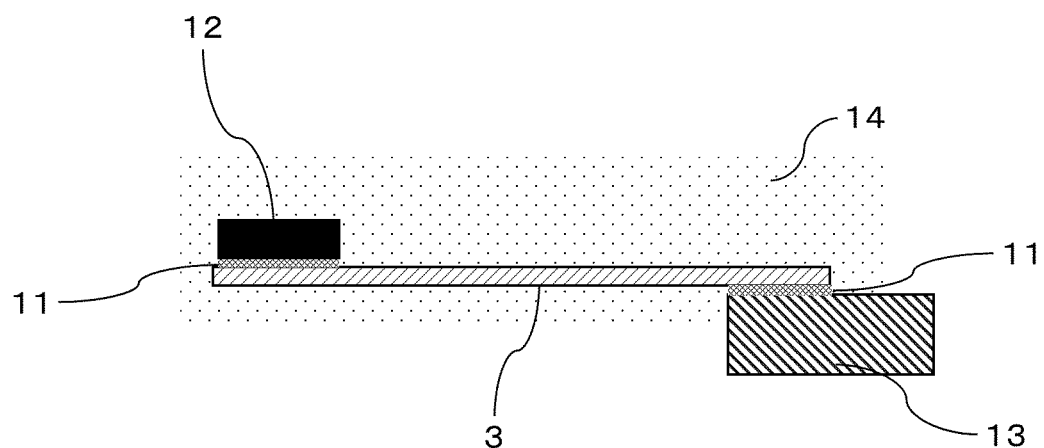
FIG. 5 is a side view illustrating a method of evaluating heat dissipation property in the present invention.

The evaluation of heat dissipation performance was performed as below. The graphite film 3 measuring 20 mm in width and 70 mm in length was cut such that a length direction coincided with a direction having a higher thermal diffusivity, and the graphite film 3 was placed on a heater 12 (10 mm×20 mm) and on a cooling block 13 via a grease 11 (silicone grease G-775 available from Shin-Etsu Chemical Co., Ltd), as illustrated in FIGS. 4 and 5. The contact area between the cooling block 13 and the graphite film 3 was set to 10 mm×20 mm. Subsequently, the graphite film 3, the heater 12, and the cooling block 13 were covered with a heat insulating material 14. The cooling block 13 was controlled to 18° C. by water cooling, and the heater 12 was powered at 0.5 W. Then, 60 minutes later, the temperature of the heater 12 was measured.

Example 1

The raw graphite film (GS1) was compressed (rolled) with the use of 10-ton precision roll press (clearance display system) available from THANK-METAL CO., LTD. equipped with two rolling bodies. Both of the rolling bodies were metal rolls each measuring 200 mm in diameter and 250 mm in width and made of SKD11 (having a hardness of greater than D95). The raw graphite film was compressed with the use of the precision roll press which was set such that the clearance between the rolling bodies was adjusted to 10 μm, and the press pressure was 3 tons, while a tension of 5.00 N/cm was applied to the raw graphite film in a rolling direction (first axial direction), which is a direction in which the film was conveyed. The thermal diffusivity and percent elongation of the obtained graphite film were measured. Table 2 shows results of the measurement. Note that "Pressure (t)" in Table 2 means "linear pressure (t/200 mm)". FIG. 2 is a Raman spectral diagram of the graphite film in accordance with Example 1 obtained by Raman spectroscopic measurement.

Example 2

A graphite film was obtained as in Example 1, except that a tension of 3.75 N/cm was applied during the compression. The thermal diffusivity and percent elongation of the obtained graphite film were measured. Table 2 shows results of the measurement.

Example 3

A graphite film was obtained as in Example 1, except that a tension of 2.50 N/cm was applied during the compression. The thermal diffusivity and percent elongation of the obtained graphite film were measured. Table 2 shows results of the measurement.

Example 4

A graphite film was obtained as in Example 1, except that a tension of 1.00 N/cm was applied during the compression. The thermal diffusivity and percent elongation of the obtained graphite film were measured. Table 2 shows results of the measurement.

Example 5

A graphite film was obtained as in Example 1, except that a tension of 10.00 N/cm was applied during the compression. The thermal diffusivity and percent elongation of the obtained graphite film were measured. Table 2 shows results of the measurement.

Example 6

A graphite film was obtained as in Example 1, except that a tension of 20.00 N/cm was applied during the compression. The thermal diffusivity and percent elongation of the obtained graphite film were measured. Table 2 shows results of the measurement.

Comparative Example 1

A graphite film was obtained as in Example 1, except that a tension of 0.90 N/cm was applied during the compression. The thermal diffusivity and percent elongation of the obtained graphite film were measured. Table 2 shows results of the measurement.

Comparative Example 2

The raw graphite film (GS1) was compressed with the use of a 50-ton pressing machine available from Shinto Metal Industries, Ltd. with a pressing pressure set to 150 kg/cm. The thermal diffusivity and percent elongation of the obtained graphite film were measured. Table 2 shows results of the measurement.

Comparative Example 3

A graphite film was obtained as in Comparative Example 2, except that the raw graphite film (GS2) was used. The thermal diffusivity and percent elongation of the obtained graphite film were measured. Table 2 shows results of the measurement.

TABLE 2

| | Raw graphite film | Compression | | | | | | Thermal diffusivity | | | Percent elongation | | | Heat dissipating effect Heater |
|---|---|---|---|---|---|---|---|---|---|---|---|---|---|---|
| | | Rolling bodies | Pressure t | Clearance μm | Tension N/cm | TAC μm | C | 1AD cm²/s | 2AD cm²/s | 1AD/ 2AD | 1AD % | 2AD % | 1AD/ 2AD | temperature °C. |
| Ex. 1 | GS1 | Metal × Metal | 3 | 10 | 5.00 | 37 | 0.529 | $8.70 \times 10^{-4}$ | $8.10 \times 10^{-4}$ | 1.074 | 0.40 | 2.50 | 0.160 | 63.7 |
| Ex. 2 | GS1 | Metal × Metal | 3 | 10 | 3.75 | 37 | 0.529 | $8.60 \times 10^{-4}$ | $8.20 \times 10^{-4}$ | 1.049 | 0.60 | 2.20 | 0.273 | 64.2 |
| Ex. 3 | GS1 | Metal × Metal | 3 | 10 | 2.50 | 37 | 0.529 | $8.50 \times 10^{-4}$ | $8.20 \times 10^{-4}$ | 1.037 | 0.80 | 1.90 | 0.421 | 64.8 |
| Ex. 4 | GS1 | Metal × Metal | 3 | 10 | 1.00 | 37 | 0.529 | $8.50 \times 10^{-4}$ | $8.30 \times 10^{-4}$ | 1.024 | 0.80 | 1.50 | 0.533 | 64.8 |
| Ex. 5 | GS1 | Metal × Metal | 3 | 10 | 10.00 | 37 | 0.529 | $8.80 \times 10^{-4}$ | $8.00 \times 10^{-4}$ | 1.100 | 1.60 | 3.50 | 0.457 | 63.2 |
| Ex. 6 | GS1 | Metal × Metal | 3 | 10 | 20.00 | 37 | 0.529 | $8.90 \times 10^{-4}$ | $8.00 \times 10^{-4}$ | 1.110 | 1.80 | 4.00 | 0.450 | 62.7 |
| Com. Ex. 1 | GS1 | Metal × Metal | 3 | 10 | 0.90 | 37 | 0.529 | $8.50 \times 10^{-4}$ | $8.40 \times 10^{-4}$ | 1.012 | 0.90 | 1.30 | 0.692 | 65.0 |
| Com. Ex. 2 | GS1 | N/A | Pressing at 150 kg/cm | | N/A | 37 | 0.529 | $8.45 \times 10^{-4}$ | $8.45 \times 10^{-4}$ | 1.000 | 1.00 | 1.00 | 1.000 | 65.1 |

TABLE 2-continued

| | Raw graphite film | Rolling bodies | Compression Pressure t | Clearance μm | Tension N/cm | TAC μm | C | Thermal diffusivity 1AD cm²/s | 2AD cm²/s | 1AD/ 2AD | Percent elongation 1AD % | 2AD % | 1AD/ 2AD | Heat dissipating effect Heater temperature °C. |
|---|---|---|---|---|---|---|---|---|---|---|---|---|---|---|
| Com. Ex. 3 | GS2 | N/A | Pressing at 150 kg/cm | | N/A | 39 | 0.411 | $8.30 \times 10^{-4}$ | $8.30 \times 10^{-4}$ | 1.000 | 1.60 | 1.60 | 1.000 | 65.2 |

"Ex." is an abbreviation for "Example", "Com. Ex." is an abbreviation for "Comparative Example", "TAC" is an abbreviation for "Thickness after compression", "C" is an abbreviation for "Compressibility", "1AD" is an abbreviation for "First axial direction", and "2AD" is an abbreviation for "Second axial direction".

Comparison of Examples 1 to 11, Comparative Example 1, and Comparative Example 2 shows that in a case where a value obtained by dividing a thermal diffusivity in the first axial direction by a thermal diffusivity in the second axial direction is 1.024 or more as anisotropic thermal diffusion property, a heater temperature is below 65.0° C. This indicates efficient heat dissipation. This is considered to have occurred because a higher degree of orientation was obtained in a direction that requires heat dissipation, by carrying out rolling with the application of a tension of 1.00 N/cm or more in the compression step.

Example 7

A graphite film was obtained as in Example 1, except that the raw graphite film (GS2) was used. The thermal diffusivity and percent elongation of the obtained graphite film were measured. Table 3 shows results of the measurement. Note that "Pressure (t)" in Table 3 means "linear pressure (t/200 mm)".

Example 8

A graphite film was obtained as in Example 1, except that the raw graphite film (GS2) was used, and a tension of 3.75 N/cm was applied during the compression. The thermal diffusivity and percent elongation of the obtained graphite film were measured. Table 3 shows results of the measurement.

Example 9

A graphite film was obtained as in Example 1, except that the raw graphite film (GS2) was used, and a tension of 2.50 N/cm was applied during the compression. The thermal diffusivity and percent elongation of the obtained graphite film were measured. Table 3 shows results of the measurement.

Example 10

A graphite film was obtained as in Example 1, except that the raw graphite film (GS3) was used. The thermal diffusivity and percent elongation of the obtained graphite film were measured. Table 3 shows results of the measurement.

Example 11

A graphite film was obtained as in Example 1, except that the raw graphite film (GS4) was used. The thermal diffusivity and percent elongation of the obtained graphite film were measured. Table 3 shows results of the measurement.

Comparative Example 4

A graphite film was obtained as in Example 1, except that the raw graphite film (GS5) was used. The thermal diffusivity and percent elongation of the obtained graphite film were measured. Table 3 shows results of the measurement.

TABLE 3

| | Raw graphite film | Rolling bodies | Compression Pressure t | Clearance μm | Tension N/cm | TAC μm | C | Thermal diffusivity 1AD cm²/s | 2AD cm²/s | 1AD/ 2AD | Percent elongation 1AD % | 2AD % | 1AD/ 2AD | Heat dissipating effect Heater temperature °C. |
|---|---|---|---|---|---|---|---|---|---|---|---|---|---|---|
| Ex. 1 | GS1 | Metal × Metal | 3 | 10 | 5.00 | 37 | 0.529 | $8.70 \times 10^{-4}$ | $8.10 \times 10^{-4}$ | 1.074 | 0.40 | 2.50 | 0.160 | 63.7 |
| Ex. 7 | GS2 | Metal × Metal | 3 | 10 | 5.00 | 39 | 0.411 | $8.90 \times 10^{-4}$ | $7.90 \times 10^{-4}$ | 1.127 | 1.00 | 3.50 | 0.286 | 61.9 |
| Ex. 8 | GS2 | Metal × Metal | 3 | 10 | 3.75 | 39 | 0.411 | $8.60 \times 10^{-4}$ | $8.00 \times 10^{-4}$ | 1.075 | 1.20 | 3.00 | 0.400 | 63.4 |
| Ex. 9 | GS2 | Metal × Metal | 3 | 10 | 2.50 | 39 | 0.411 | $8.40 \times 10^{-4}$ | $8.20 \times 10^{-4}$ | 1.024 | 1.40 | 2.00 | 0.700 | 64.5 |
| Ex. 10 | GS3 | Metal × Metal | 3 | 10 | 5.00 | 34 | 0.567 | $8.70 \times 10^{-4}$ | $8.30 \times 10^{-4}$ | 1.048 | 1.00 | 3.20 | 0.313 | 64.2 |
| Ex. 11 | GS4 | Metal × Metal | 3 | 10 | 5.00 | 43 | 0.384 | $8.70 \times 10^{-4}$ | $7.60 \times 10^{-4}$ | 1.117 | 1.20 | 3.50 | 0.343 | 59.4 |
| Com. Ex. 4 | GS5 | Metal × Metal | 3 | 10 | 5.00 | 34 | 0.756 | $8.40 \times 10^{-4}$ | $8.30 \times 10^{-4}$ | 1.012 | 0.90 | 1.30 | 0.692 | 65.9 |

"Ex." is an abbreviation for "Example", "Com. Ex." is an abbreviation for "Comparative Example", "TAC" is an abbreviation for "Thickness after compression", "C" is an abbreviation for "Compressibility", "1AD" is an abbreviation for "First axial direction", and "2AD" is an abbreviation for "Second axial direction".

In Comparative Example 4, as in Example 1 and Examples 4 to 8, rolling was carried out with the application of a tension of 5.00 N/cm, but anisotropic thermal diffusion property was expressed poorly, and consequently, the heater temperature was higher than 65° C. In contrast, Example 1 and Examples 4 to 8 show that anisotropic thermal diffusion property was expressed, and a high degree of heat dissipation property was obtained. This is correlated with the compressibility of the graphite film before and after rolling. It can be seen that the compressibility of 0.567 or less provides a good heat dissipation property.

Example 12

A graphite film was obtained as in Example 1, except that the raw graphite film was compressed with the use of a precision roll press with a pressing pressure set to 1 ton. The thermal diffusivity and percent elongation of the obtained graphite film were measured. Table 4 shows results of the measurement. Note that "Pressure (t)" in Table 4 means "linear pressure (t/200 mm)".

TABLE 4

| | Raw graphite film | Rolling bodies | Compression | | | | | Thermal diffusivity | | | Percent elongation | | | Heat dissipating effect Heater temperature ° C. |
|---|---|---|---|---|---|---|---|---|---|---|---|---|---|---|
| | | | Pressure t | Clearance μm | Tension N/cm | TAC μm | C | 1AD cm²/s | 2AD cm²/s | 1AD/ 2AD | 1AD % | 2AD % | 1AD/ 2AD | |
| Ex. 1 | GS1 | Metal × Metal | 3 | 10 | 5.00 | 37 | 0.529 | 8.70 × 10⁻⁴ | 8.10 × 10⁻⁴ | 1.074 | 0.40 | 2.50 | 0.160 | 63.7 |
| Ex. 12 | GS1 | Metal × Metal | 1 | 10 | 5.00 | 40 | 0.571 | 8.50 × 10⁻⁴ | 8.20 × 10⁻⁴ | 1.037 | 0.20 | 2.00 | 0.100 | 63.1 |

"Ex." is an abbreviation for "Example", "Com. Ex." is an abbreviation for "Comparative Example", "TAC" is an abbreviation for "Thickness after compression", "C" is an abbreviation for "Compressibility", "1AD" is an abbreviation for "First axial direction", and "2AD" is an abbreviation for "Second axial direction".

Comparison between Example 1 and Example 12 shows that a higher degree of anisotropic thermal diffusion property is achieved through the application of a higher pressure (linear pressure), and a higher degree of heat dissipation property is, in turn, achieved.

Example 13

A graphite film was obtained as in Example 1, except for the points below. Both of the rolling bodies were resin rolls each measuring 200 mm in diameter and 250 mm in width and having a hardness of D85. A clearance between the rolling bodies was adjusted to −200 μm. A tension of 1.00 N/cm was applied during the compression. The thermal diffusivity and percent elongation of the obtained graphite film were measured. Table 5 shows results of the measurement. Note that "Pressure (t)" in Table 5 means "linear pressure (t/200 mm)".

TABLE 5

| | Raw graphite film | Rolling bodies | Compression | | | | | Thermal diffusivity | | | Percent elongation | | | Heat dissipating effect Heater temperature ° C. |
|---|---|---|---|---|---|---|---|---|---|---|---|---|---|---|
| | | | Pressure t | Clearance μm | Tension N/cm | TAC μm | C | 1AD cm²/s | 2AD cm²/s | 1AD/ 2AD | 1AD % | 2AD % | 1AD/ 2AD | |
| Ex. 1 | GS1 | Metal × Metal | 3 | 10 | 5.00 | 37 | 0.529 | 8.70 × 10⁻⁴ | 8.10 × 10⁻⁴ | 1.074 | 0.40 | 2.50 | 0.160 | 63.7 |
| Ex. 13 | GS1 | Resin (D85) × Resin (D85) | 3 | −200 | 1.00 | 37 | 0.529 | 8.60 × 10⁻⁴ | 8.20 × 10⁻⁴ | 1.049 | 0.80 | 1.90 | 0.421 | 64.2 |

"Ex." is an abbreviation for "Example", "Com. Ex." is an abbreviation for "Comparative Example", "TAC" is an abbreviation for "Thickness after compression", "C" is an abbreviation for "Compressibility", "1AD" is an abbreviation for "First axial direction", and "2AD" is an abbreviation for "Second axial direction".

Comparison between Example 1 and Example 13 shows that a higher degree of anisotropic thermal diffusion property is achieved through the use of rolling bodies made of a higher hardness material.

Example 14

A graphite film was obtained as in Example 4, except that the raw graphite film (GS6) was used. The thermal diffusivity and percent elongation of the obtained graphite film were measured. Table 6 shows results of the measurement.

TABLE 6

| Raw graphite film | Rolling bodies | Compression | | | | | Thermal diffusivity | | | Percent elongation | | | Heat dissipating effect Heater temperature ° C. |
|---|---|---|---|---|---|---|---|---|---|---|---|---|---|
| | | Pressure t | Clearance μm | Tension N/cm | TAC μm | C | 1AD cm²/s | 2AD cm²/s | 1AD/ 2AD | 1AD % | 2AD % | 1AD/ 2AD | |
| Ex. 4 | GS2 | Metal × Metal | 3 | 10 | 5.00 | 39 | 0.411 | 8.90 × 10⁻⁴ | 7.90 × 10⁻⁴ | 1.127 | 1.00 | 3.50 | 0.286 | 61.9 |
| Ex. 14 | GS6 | Metal × Metal | 3 | 10 | 5.00 | 39 | 0.411 | 8.80 × 10⁻⁴ | 8.00 × 10⁻⁴ | 1.100 | 1.20 | 3.40 | 0.353 | 62.4 |

"Ex." is an abbreviation for "Example", "Com. Ex." is an abbreviation for "Comparative Example", "TAC" is an abbreviation for "Thickness after compression","C" is an abbreviation for "Compressibility", "1AD" is an abbreviation for "First axial direction", and "2AD" is an abbreviation for "Second axial direction".

Comparison between Example 4 and Example 14 shows that an even higher degree of anisotropic thermal diffusion property is achieved through the application of a tension in one in-plane direction in the heat treatment step as well.

REFERENCE SIGNS LIST

1: First axial direction (direction having the highest thermal diffusivity)
2: Second axial direction (direction orthogonal to the first axial direction)
3: Graphite film
4: Rolling bodies
5: Center points
6: Clearance
7: Distance between the center points
8: Raw graphite film
11: Grease
12: Heater
13: Cooling block
14: Heat insulating material

The invention claimed is:

1. A graphite film, including a first axial direction and a second axial direction, the first axial direction being a direction having a highest thermal diffusivity in a film surface, the second axial direction being orthogonal to the first axial direction in the film surface,
    wherein a value obtained by dividing the thermal diffusivity in the first axial direction by a thermal diffusivity in the second axial direction is not less than 1.020 and not more than 1.300.

2. The graphite film according to claim 1, wherein a percent elongation in the first axial direction obtained through measurement in a tensile test is lower than a percent elongation in the second axial direction obtained through measurement in the tensile test,
    wherein in the tensile test, the measurement is carried out according to ASTM-D-882 such that a sample shaped in a size-1 dumbbell defined in JIS K 6251 is cut from the graphite film, the sample is elongated at a chuck-to-chuck distance of 100 mm, at a tension speed of 50 mm/min, and at room temperature until the sample breaks, and the percent elongation is calculated.

3. The graphite film according to claim 1, wherein a percent elongation in the first axial direction obtained through measurement in a tensile test is not less than 0.20% and not more than 1.80%, and
    a percent elongation in the second axial direction obtained through measurement in a tensile test is not less than 1.50% and not more than 4.00%,
    wherein in the tensile test, the measurement is carried out according to ASTM-D-882 such that a sample shaped in a size-1 dumbbell defined in JIS K 6251 is cut from the graphite film, the sample is elongated at a chuck-to-chuck distance of 100 mm, at a tension speed of 50 mm/min, and at room temperature until the sample breaks, and the percent elongation is calculated.

4. The graphite film according to claim 1, wherein when a peeled surface exposed by peeling a surface of the graphite film is subjected to Raman spectroscopic measurement, a peak of a D-band appears in a vicinity of 1300 cm$^{-1}$ to 1400 cm$^{-1}$.

5. A method of producing a graphite film, comprising the steps of:
    preparing a raw graphite film by subjecting a polymeric film to heat treatment until the raw graphite film has a thickness which is not less than 0.900 times and not more than 1.500 times a thickness of the polymeric film; and
    until the graphite film has a thickness which is 0.600 times or less a thickness of the raw graphite film, compressing the raw graphite film in a state in which a tension of not less than 1.00 N/cm and not more than 20.00 N/cm is applied to the raw graphite film in one direction of the raw graphite film.

6. The method according to claim 5, wherein the compression is carried out by rolling, and
    the tension is applied in a rolling direction.

7. The method according to claim 5, wherein the step of preparing the raw graphite film includes a step of subjecting a polymeric film to heat treatment in a state in which a tension is applied to the polymeric film in one direction of the polymeric film.

8. The method according to claim 5, wherein a linear pressure of 1 ton or more per 200 mm of the raw graphite film is applied to the raw graphite film during the compression.

* * * * *